US011878778B1

(12) United States Patent
Viterna (10) Patent No.: US 11,878,778 B1
(45) Date of Patent: Jan. 23, 2024

(54) SELF ELEVATING ARTICULATED LIGHTWEIGHT FLOATING TOWER

(71) Applicant: Larry Alan Viterna, Vermilion, OH (US)

(72) Inventor: Larry Alan Viterna, Vermilion, OH (US)

( * ) Notice: Subject to any disclaimer, the term of this patent is extended or adjusted under 35 U.S.C. 154(b) by 371 days.

(21) Appl. No.: 17/404,653

(22) Filed: Aug. 17, 2021

(51) Int. Cl.
| | |
|---|---|
| *B63B 35/44* | (2006.01) |
| *B63B 21/20* | (2006.01) |
| *B63B 21/16* | (2006.01) |
| *B63B 22/04* | (2006.01) |
| *B63B 39/00* | (2006.01) |
| *B63B 21/04* | (2006.01) |

(52) U.S. Cl.
CPC .............. *B63B 35/44* (2013.01); *B63B 21/04* (2013.01); *B63B 21/16* (2013.01); *B63B 21/20* (2013.01); *B63B 22/04* (2013.01); *B63B 39/00* (2013.01); *B63B 2021/203* (2013.01); *B63B 2035/446* (2013.01)

(58) Field of Classification Search
CPC ......... B63B 35/44; B63B 21/04; B63B 21/16; B63B 21/20; B63B 22/04; B63B 39/00; B63B 2021/203; B63B 2035/446
See application file for complete search history.

(56) References Cited

U.S. PATENT DOCUMENTS

| 10,308,328 B2 * | 6/2019 | Siegfriedsen | ........... B63B 21/50 |
| 2013/0052015 A1 * | 2/2013 | Velund | .................... F03D 13/25 416/85 |

* cited by examiner

*Primary Examiner* — Anthony D Wiest (57) ABSTRACT

A floating platform comprised of a tower, buoyant outriggers, and an articulated arm can be used in one embodiment to support an offshore wind turbine. The buoyant articulated arm is positioned with a winch system that supports the tower in a nearly horizontal position during assembly at shore and during transport. The winch and articulated arm elevate the system into its operational position at sea. The tower may include a keel structure to reduce motions and stresses on the system. The floating platform may rotate about an area surrounding an anchor system without active wind alignment equipment. The natural alignment with the wind allows for optimization of the structure, resulting in lighter-weight, less material mass and ultimately lower cost. The horizontal transport alleviates clearance restrictions of many bridges. Requiring neither large cranes nor specialized ships during installation, its ability to raise itself is scalable to large sizes lowering cost.

9 Claims, 8 Drawing Sheets

SELF ELEVATING ARTICULATED LIGHTWEIGHT FLOATING TOWER

CROSS-REFERENCE TO RELATED APPLICATIONS

This application claims the benefit of U.S. Provisional Application No. 63/070,050, filed Aug. 25, 2020, the disclosure of which is incorporated herein by reference.

TECHNICAL FIELD

This invention relates in general to floating offshore systems such as wind turbines and in particular to a floating platform with an integral tower and deployment mechanism.

BACKGROUND ART

Oceans and lakes represent over 70 percent of the Earth's surface. More and more, these bodies of water are being used with systems such as energy production, communications, meteorological and environmental monitoring. Equipment for such systems often requires towers and, as water depth increases, floating platforms to support the towers and equipment. Severe winds and waves increase the weights and costs of offshore equipment because material or complex control systems are often added to manage the increased loading conditions of those winds and waves.

Wind turbine systems are an important example of the transition from on-land to offshore systems. Wind turbine systems convert the energy in moving air (e.g., wind) into other useful forms of energy, usually electricity. Prior art wind turbine systems usually include a turbine rotor with blades along with an electrical generator and various supporting mechanical equipment. The generator and supporting equipment are housed in a nacelle that is rotatably mounted upon an upper end of a vertical tower. During normal operation, active control systems manage motors that rotate the wind turbine with the direction of the wind. However, when shutdown, high winds can come at the wind turbine rotor from any direction, becoming a costly design driver. For offshore use, the variability of wind and wave forces can cause coupled dynamic motions of the tower and turbine rotor, resulting in more costly designs.

The following is a tabulation of some prior art that presently appears relevant:

| U.S. Patents | | | |
| --- | --- | --- | --- |
| Pat. No. | Kind Code | Issue Date | Patentee |
| 10,337,499 | B1 | 2019 Jul. 2 | Srinivasan |
| 9,810,204 | B2 | 2017 Nov. 7 | Aubault, et. Al. |
| 7,612,462 | B2 | 2009 Nov. 3 | Viterna |

| U.S. patent applications | | | |
| --- | --- | --- | --- |
| Pat. No. | Kind Code | Issue Date | Patentee |
| 20200362825 | A1 | 2020 Nov. 19 | Barber |

| Foreign Patent Documents | | | |
| --- | --- | --- | --- |
| Foreign Doc. Nr. | Kind Code | Issue Date | App or Patentee |
| WO2020180194 | A1 | 2020 Oct. 9 | Krogenes, et. Al. |
| CN102975823B | B | 2015 Mar. 11 | Shenyang Xuantong |

| Nonpatent Literature Documents |
| --- |
| IRENA Report, "Floating Foundations: A Game Changer for Offshore Wind Power", 2016 |

Floating wind turbines for deep water installations are now becoming operational commercially. Their installation costs are significantly higher than on-land because of the increased effort required while working on and in the water. Some floating wind turbines are partially assembled at a port and then transported to the installation site where assembly is completed using large cranes and specialized vessels. The wind turbines are then attached to anchors using mooring lines. Other floating wind turbines have been fully assembled at a port in an upright position. Transporting upright floating turbines requires multiple boats or ships to provide stability during the time when there is no connection to mooring lines and anchors. This is especially important during times of greater windspeed and wave heights. Some floating wind turbines also use active control systems with pumps to manage water ballast systems in order to provide enhanced stability. These can add significant initial hardware, as well as operating costs, however. During extreme storms, it is likely that electrical power will be lost and these active control systems may not be functional.

Transporting wind turbines in an upright position has an additional cost due to limited access to the ports. Many of the existing ports large enough to assemble wind turbines are located on waterways that have clearance restrictions due to bridges. Today's floating turbines already exceed the clearance heights of even the largest bridges such as the Golden Gate Bridge in California.

In the future, the aforementioned challenges will only increase as wind turbine size continues to increase. Therefore, it would be desirable to provide a floating platform and tower that is not only more capable in managing wind and wave forces, but can also be assembled and installed in a safer and less costly manner.

Other offshore systems such as communications and environmental monitoring systems continue to be developed and placed into service. Ease of deployment, increasing tower height, more severe weather conditions and costs are design drivers for these applications as well.

SUMMARY OF THE EMBODIMENTS

A floating platform comprised of a tower, buoyant outriggers, and an articulated arm can be used to support a variety of equipment and systems in the offshore environment. The buoyant articulated arm is positioned with a winch system that supports the tower in a nearly horizontal position during assembly at shore and during transport. The winch and articulated arm elevate the system into its operational position at sea. The tower may include a keel structure to reduce motions and stresses on the system. The floating platform is able to rotate about an area surrounding an anchor system without active wind alignment equipment. The anchor system can consist of several mooring lines and anchor(s) or can have a single anchor and mooring line. The natural alignment with the wind allows for optimization of the structure, resulting in lighter-weight and ultimately lower cost. The horizontal assembly reduces lifting requirements of support equipment and clearance restrictions during transport. Requiring neither large cranes nor specialized ships during installation, its ability to raise itself is scalable to very large sizes.

It is apparent from the above description that the floating platform has design characteristics that translate to lower cost compared to the prior art. A system, having a floating platform may include one or more of the following features and/or benefits:
- reduces assembly time and costs at the port;
- reduces clearance requirements for transport under bridges;
- increases stability during transport, lowering risk;
- has minimal anchors and environmental impact on the sea floor;
- does not require costly special ships and cranes at sea;
- reduces installation time and costs offshore;
- eliminates hardware for aligning the system with the wind;
- yields lighter weight, lower material cost structures;
- is scalable to very large systems;
- is applicable to both shallow water and deep water installations;

| Drawings - Reference numerals | |
|---|---|
| 1 | floating wind turbine system |
| 2 | rotor |
| 3 | blades |
| 4 | rotor hub |
| 5 | nacelle |
| 6 | rotor axis |
| 7 | tower axis |
| 8 | articulated support arm |
| 9 | arm hinge |
| 10 | wind direction |
| 11 | keel |
| 12 | electric generator |
| 13 | wind turbine generator |
| 14 | tower |
| 15 | floating platform |
| 16 | buoyant outrigger (first side) |
| 17 | buoyant outrigger (second side) |
| 18 | support arm mate |
| 19 | rotatable anchor connection |
| 20 | submersible electrical conductor |
| 21 | anchor |
| 22 | sea surface |
| 23 | mooring line |

| Drawings - Reference numerals (continued) | |
|---|---|
| 24 | guy post |
| 25 | first type of guy cable pair |
| 26 | second type of guy cable pair |
| 27 | third type of guy cable pair |
| 28 | support arm connection |
| 29 | movement of support arm mate |
| 30 | cable |
| 31 | anchor system |
| 32 | support arm lock |

DETAILED DESCRIPTION OF SPECIFIC EMBODIMENTS

It is emphasized that the drawings and description included herein are a preferred embodiment and are not intended to limit the invention or claims. Instead, the invention is intended to cover all modifications, equivalents, and alternatives in the character and scope of the invention. In describing the preferred embodiment of the invention, common or similar characteristics are indicated by identical reference numerals, or in the absence of a reference numeral, are evident based upon the drawings or description. The figures are not necessarily to scale and may be shown exaggerated in scale for purposes of clarity and conciseness. The subject matter referred to using the terms "present invention", "invention," and variations as used throughout this document are to mean one or more possible embodiments of the invention and are not intended to, and should not, limit any claims merely because of such reference.

Figure 1:
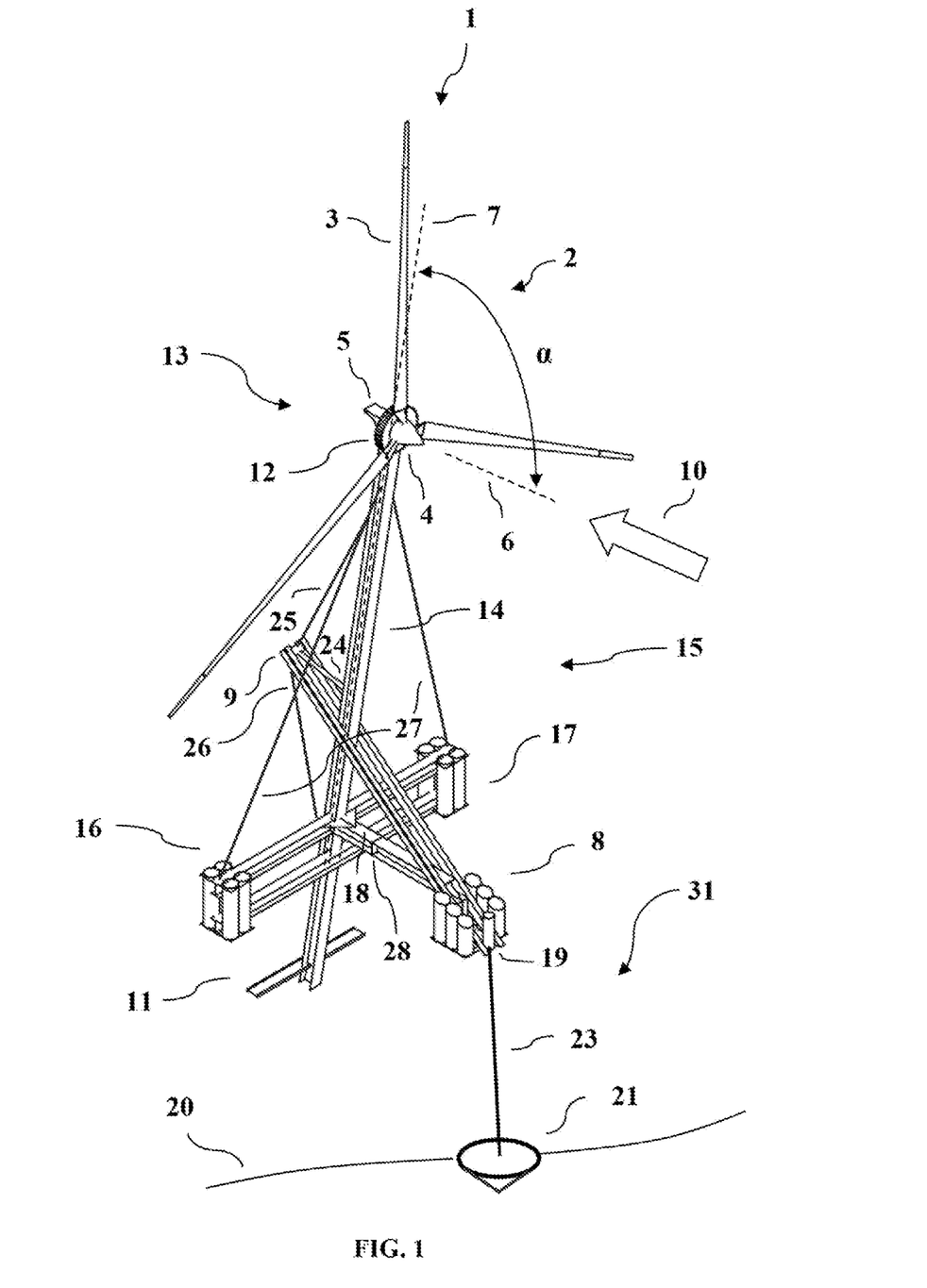
FIG. 1 is a perspective view of an embodiment of a floating platform that is in accordance with the present invention as part of a floating wind turbine system.

Referring now to the drawings, there is illustrated in FIG. 1 a floating wind turbine system, indicated generally at 1, that is in accordance with, and includes, the present invention. The floating wind turbine system 1 includes a wind turbine rotor, indicated generally at 2, having one or more blades 3 that are attached to a rotor hub 4. As illustrated, the floating wind turbine system 1 has three of the blades 3. Alternatively, the floating wind turbine system 1 may have more or less than the three blades 3 illustrated. The rotor hub 4 is attached to a rotating shaft (not shown) that is disposed in a generator or mechanical equipment within a nacelle 5, with the rotating shaft defining a rotor axis 6 for both the rotor 2 and the shaft. As shown in FIG. 1, the rotor axis 6 lies approximately in line with a wind direction 10, shown by an arrow.

The nacelle 5 contains drive train components such as, for example, brakes, lubrication pumps and miscellaneous other mechanical and electrical equipment (not shown). Thus, as the wind drives rotation of the rotor 2, the rotation of the rotor 2 is transferred through the mechanical equipment to rotate an armature within the electric generator 12, thereby generating electricity. With regard to the nacelle 5, the rotor 2 is mounted upon an upwind end of the housing. The blades 3, rotor hub 4, and nacelle 5 form a wind turbine generator, indicated generally at 13.

A floating platform, indicated generally at 15, for the floating wind turbine system 1 comprises buoyant outriggers 16 and 17, an integrated tower 14, a keel 11, an articulated support arm 8, a rotatable anchor connection 19, and any necessary measurement data exchange with the control system of the floating wind turbine system 1.

Referring to FIG. 1, the wind turbine generator 13 is mounted upon an upper end of the tower 14 and forms an acute angle of a that is defined between the rotor axis 6 and a longitudinal tower axis 7 of the tower 14. Floating wind turbines are the first wind turbines to experience significant movement of their towers. For example, wind turbines on-land typically do not experience significant movement of their towers. Prior art wind turbine technology can experience large cyclic bending stresses in the blades. The blades are designed to be as structurally stiff as is necessary to keep the blades from impacting with the tower. Prior art wind turbines have a tower that is vertical (i.e., substantially 90 degrees to a horizon) which limits permissible flexibility of the rotor and blades. In contrast, the tower 14 leans upwind, providing clearance to allow for more flexible and lower cost blades 3 and rotor 2 designs. The clearance is preferably provided between the tower axis 7 and a line vertical to a horizon.

Figure 2:
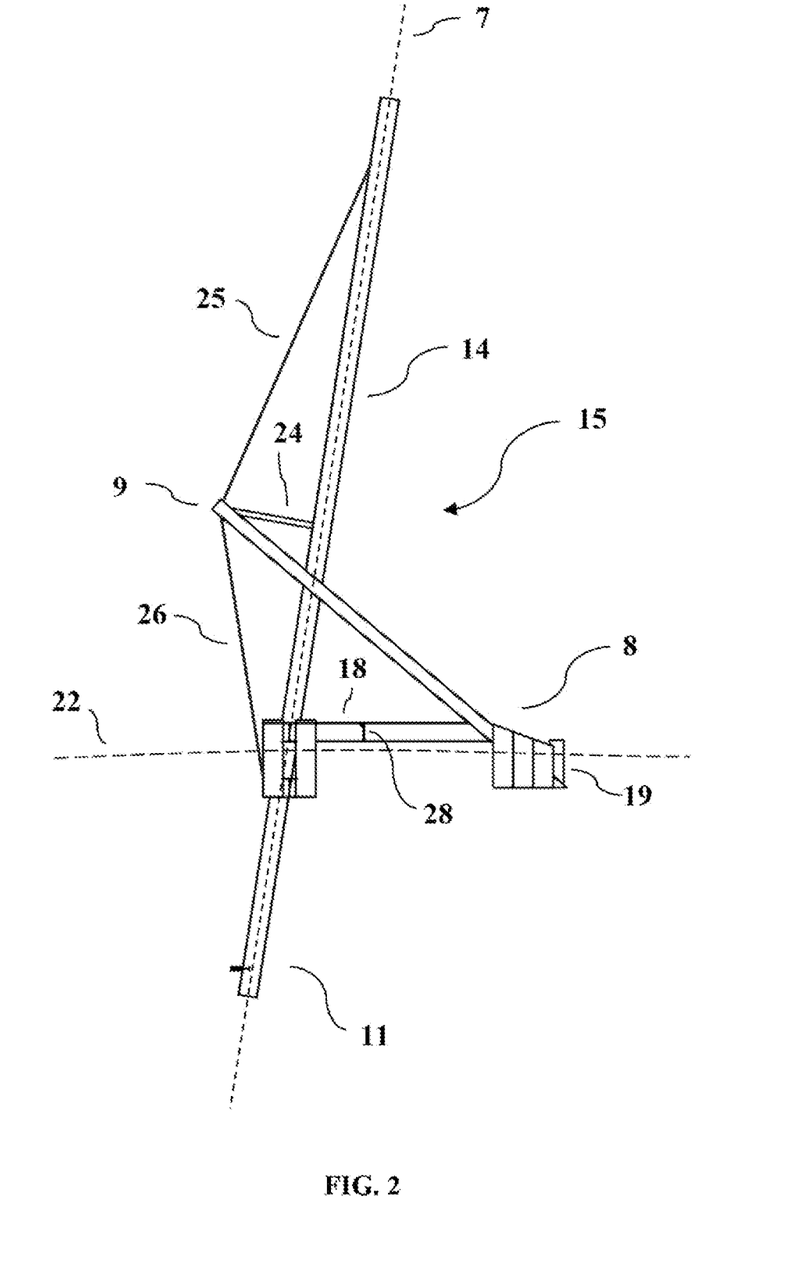
FIG. 2 is a side view of the floating platform of FIG. 1.
Figure 3:
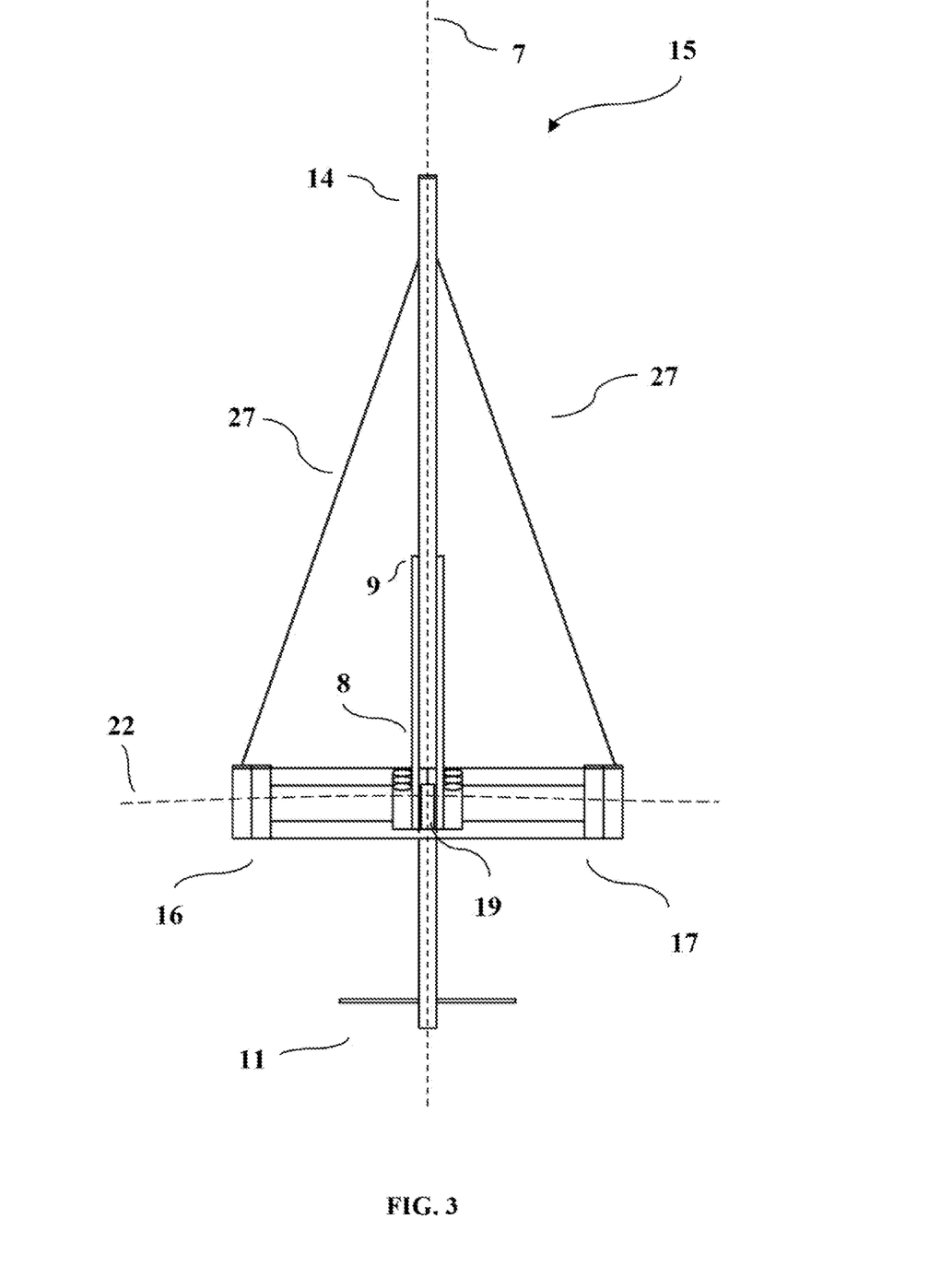
FIG. 3 is a front view of the floating platform of FIG. 1.
Figure 4:
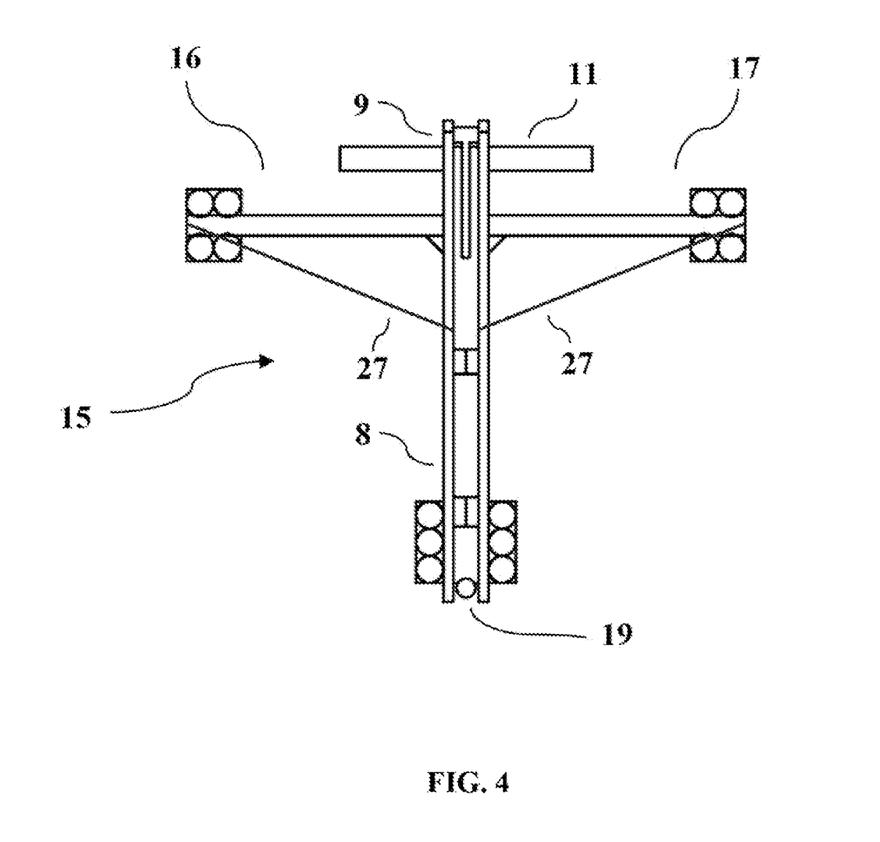
FIG. 4 is a top view of the floating platform of FIG. 1.

For further reference, FIG. 2, FIG. 3, and FIG. 4 are a side view, front view, and top view, respectively, of the floating platform 15 to augment in clarifying the components shown previously in FIG. 1 for the floating wind turbine system 1.

At or near a submerged end of the tower 14 are two structures, the buoyant outrigger 16 and buoyant outrigger 17 that extend away on each side from a plane that includes the rotor axis 6 and the tower axis 7. The buoyant outrigger 16 and the buoyant outrigger 17 each have buoyant structures or other systems located at or near ends that are away from the tower 14 as well as outriggers or other structural members that connect the buoyant structures to the tower 14. It should be noted that while the buoyant outrigger 16 and the buoyant outrigger 17 may look identical but symmetric, they may in fact be designed with slightly different weights and buoyancy volumes to provide countering forces to the torque introduced by the wind turbine generator 13.

As illustrated, the buoyant outriggers 16 and 17 are perpendicular to the plane that includes the rotor axis 6 and the tower axis 7. Alternatively, the buoyant outriggers 16 and 17 may be other than perpendicular to the plane that includes the rotor axis 6 and the tower axis 7. As a non-limiting example, the buoyant outriggers 16 and 17 may be at same or different angles to the plane that includes the rotor axis 6 and the tower axis 7. As illustrated, the buoyant outriggers 16 and 17 are symmetric across the plane that includes the rotor axis 6 and the tower axis 7. Alternatively, the buoyant outriggers 16 and 17 may be asymmetric across the plane that includes the rotor axis 6 and the tower axis 7.

At or near the end of the tower 14 that is nearest the water, a keel 11 structure continues beneath the sea surface (indicated at 22 on the floating platform 15 as a waterline). The keel 11 provides additional stability to the floating platform 15 by increasing hydrodynamic drag and inertial force from ballast water to resist motions of the floating platform 15. Reducing these motions further reduces damaging loads on other components such as the rotor hub 4 and blades 3.

An articulated support arm 8 is a component of the floating platform 15 that serves as a third buoyant outrigger supporting the wind turbine generator 13. The articulated support arm 8 connects to an arm hinge 9 located on the downwind end of a guy post 24 having a first end attached to the tower 14 and extending substantially perpendicular therefrom. The articulated support arm 8 extends from the arm hinge 9 in an upwind and downward direction to its buoyant end floating in the water. Additional structural elements of the articulated support arm 8 extend from its buoyant end, back downwind and can be connected to a support arm mate 18 using a support arm connection 28. As such, the articulated support arm 8 has first and second legs that each extend from the buoyant end such that the articulated support arm 8 has a generally uneven "V" shape. The first leg of the "V" shape extends from the buoyant end to the arm hinge 9 and the second leg of the "V" shape extends from the buoyant end to the support arm connection 28.

When the support arm connection 28 is released, the arm hinge 9 allows the articulated support arm 8 to move to other positions during wind turbine assembly and installation, as will be discussed later. The articulated support arm 8 is provided cooperatively with the tower 14. As a non-limiting example, the tower 14 may pass through the articulated support arm 8 such that movement of the articulated support arm 8 is not impeded.

A rotatable anchor connection 19 is preferably mounted to the upwind end of the articulated support arm 8. The rotatable anchor connection 19 may include a rotatable slip ring (not shown) for transferring the electrical power from the electric generator 12 through a submersible electrical conductor 20 to a substation or power load (not shown). The power load may be located either underwater or upon land. In the latter case, the submersible electrical conductor 20 extends from the wind turbine system across the sea floor to the shore and the load. An anchor system 31 comprised of a set of mooring lines 23 and an anchor 21 that is located below the sea surface 22 upon the sea floor. The set of mooring lines 23 extends from the rotatable anchor connection 19 to the anchor 21 and co-operate with the rotatable anchor connection 19 to maintain the floating wind turbine system 1 in position upon the sea surface 22.

While floating platform 15 is illustrated utilizing a single set of mooring lines 23 and a single anchor 21, it will be appreciated that the floating platform 15 may also have multiple sets of mooring lines connected to multiple anchors (not shown). Also, while the floating platform 15 preferably utilizes mooring lines and an anchor, it will be appreciated that the floating platform 15 may also utilize other rotatable anchor connection devices attached to the tower 14 that are operable to retain the tower 14 within a desired area. Such rotatable anchor connection devices would also allow the tower to move in response to changing wind conditions and/or changing wave conditions. For example, the submerged end of the articulated support arm 8 may be mounted upon the upper end of a submerged piling that is set in the sea bed with a pivoting and rotating connector (not shown).

The floating platform 15 is designed to respond to changes in the wind speed and direction by movement through the water and rotation upon the surface of the water. The system configuration of the large distance between the rotatable anchor connection 19 and the rotor hub 4 allows the wind turbine to follow the wind direction similar to a kite following the wind around a person's hand. As such, the entire floating wind turbine system 1 is free to rotate about the anchor 21 as the wind direction changes. Thus, the wind pressure upon the blades 3 and sides of the tower 14 and nacelle 5 co-operate with the rotatable anchor connection 19 to help pivot the system relative to the anchor 21. This natural and passive alignment of the rotor axis 6 with the wind direction 10 is generally effective for both when the floating wind turbine system 1 is operating and when it is shutdown such as during extreme weather. However, further refinement of the alignment with the wind direction 10 can be attained with an active control system, as discussed later.

Additional structural members are used to increase the load carrying capability of the floating platform 15, including the guy post 24 attached to the tower 14. Guy cables that have swivel end connectors to reduce bending loads are used throughout the floating platform 15. A first type of guy cable pair 25 has ends secured near, or at, the top end of the tower 14 and the second end of the guy post 24. A second type of guy cable pair 26 has ends secured near, or at, the end of the tower 14 that is near the buoyant outriggers 16 and 17 and the second end of the guy post 24. A third type of guy cable 27 extends from the buoyant outrigger 16 to the top of the tower 14 as well as from the buoyant outrigger 17 to the top of the tower 14.

While three types of guys are shown in the figures, it will be appreciated that the more or less guy posts and/or guy cables than as illustrated may be provided for the floating platform 15.

The specific lengths of the individual components including the portions that extend above and below the sea surface 22, for the tower 14, floating platform 15, the articulated support arm 8, the set of mooring lines 23, and angles a are dependent upon the specific weights of the components in the system as well as the expected forces generated by wind and water for the selected placement location. Engineering analysis and design studies will balance forces under different combinations of wind and wave loads for optimum operation of the wind turbine generator 13.

Figure 5:
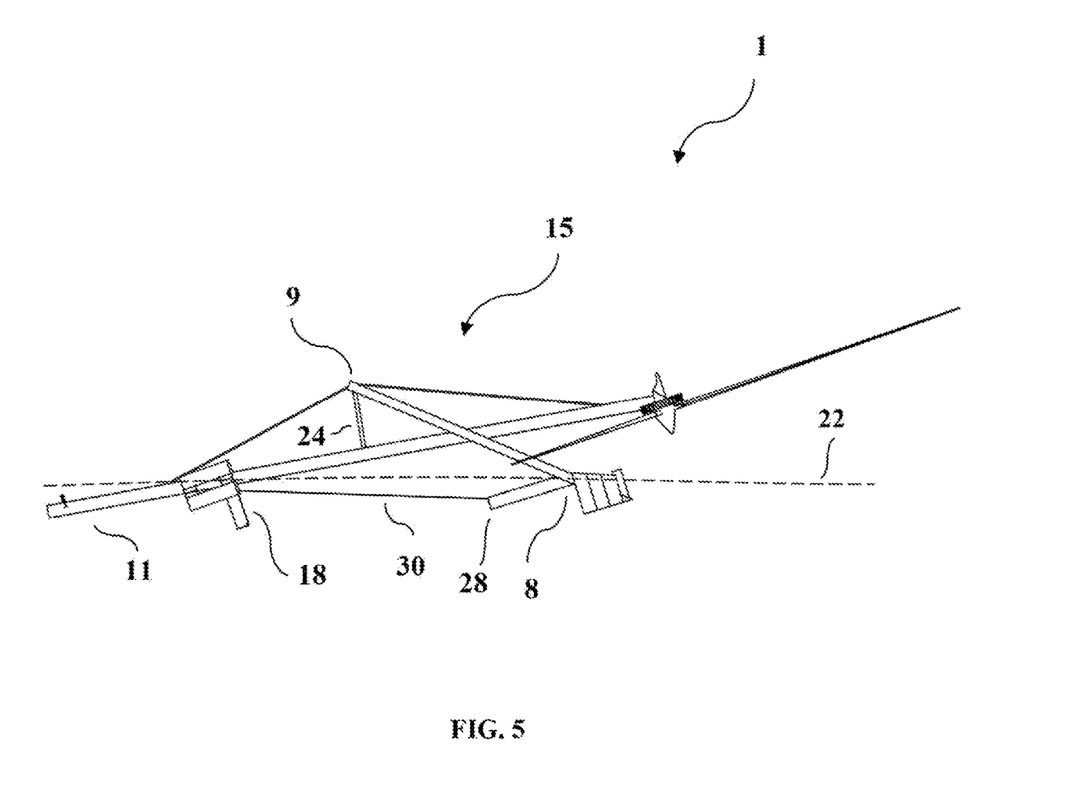
FIG. 5 is a side view of the floating platform of FIG. 1 configured for transport as part of the floating wind turbine system.

Full or partial assembly of the wind turbine generator 13 with the floating tower 15 in the near horizontal position may occur at a port. For assembly and transport, support arm mate 18 is not closely attached and instead the articulated support arm 8 is rotated about the arm hinge 9, as shown in FIG. 5. A cable 30 and winch (not shown) between the support arm mate 18 and the articulated support arm 8 maintain the position. The position shown in FIG. 5 may also be maintained during transportation to the offshore installation site during which the floating wind turbine system 1 will float under its own buoyancy and be towed or pushed by a ship(s) or tug boat(s).

Figure 6:
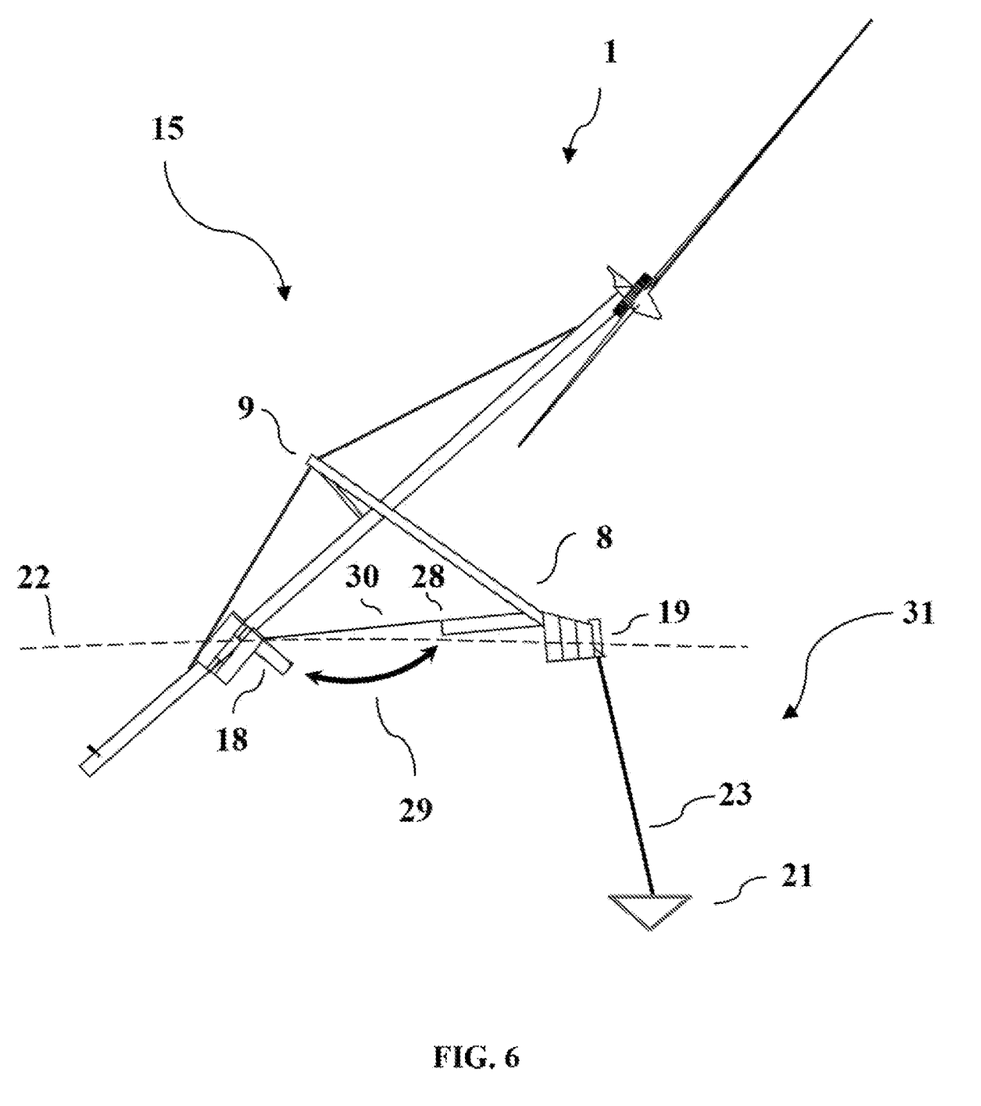
FIG. 6 is a side view of the floating platform of FIG. 1 during installation as part of the floating wind turbine system.

Referring now to FIG. 6, a method for placing the floating wind turbine system 1 in its operating position at the offshore installation site is illustrated. In FIG. 6, a set of mooring lines 23 is attached to an anchor 21 which has been pre-positioned upon the sea floor. The floating wind turbine system 1 is brought near so that the rotatable anchor connection 19 is attached to the upper end of the anchor system 31. The cable 30 and winch (not shown) are used to pull the support arm mate 18 of the floating platform 15 to mate with the corresponding end of the articulated support arm 8. The curved double headed arrow 29 denotes movement of the support arm mate 18 towards the articulated support arm 8. This movement causes the floating wind turbine system 1 to raise itself into the installed position. The support arm connection 28 between the support arm mate 18 and the articulated support arm 8 is then secured with suitable fasteners such as bolts or cables.

A typical wind turbine generator 13 or other equipment (as non-limiting examples, the other equipment may be telecommunications equipment such as antennas and/or a signal relay, meteorological equipment such as to measure wind speed and/or direction compared to at the sea surface 22, or environmental equipment such as for detecting and/or measuring atmospheric and/or oceanic chemicals) to be placed upon the tower 14 will often have a control system (not shown) to manage and/or measure a number of subsystems' parameters including but not limited to the following: blade pitch angle, generator speed, wind speed, wind direction, and rotor axis direction as well as stresses and accelerations in critical structural components. The floating wind turbine system 1 might also use an active control system to not only control electrical power, but also might incorporate predictive and/or feedback loops to minimize motions of the floating platform 15 thereby minimizing damaging structural stresses throughout the floating wind turbine system 1. Furthermore, it is expected that aerodynamic forces controlled by independent blade pitch can be used to augment the ability and accuracy of the floating wind turbine system 1 to align the rotor axis 6 with the wind direction 10 to optimize the energy output.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope. For example, the exact shape and water depth of the keel will depend on water and wind conditions. In addition, it should be noted that while the embodiment in the figures uses specific cross-sectional shapes for the tower 14, floating platform 15, and the articulated support arm 8, it will be appreciated that other structural cross-section shapes including, but not limited to, plates, truss, tubes and I-beams may be used depending on manufacturing and assembly considerations. It should also be noted that the tower 14, floating platform 15 and articulated support arm 8 may be made using various materials such as steel, concrete and composites.

Figure 7:
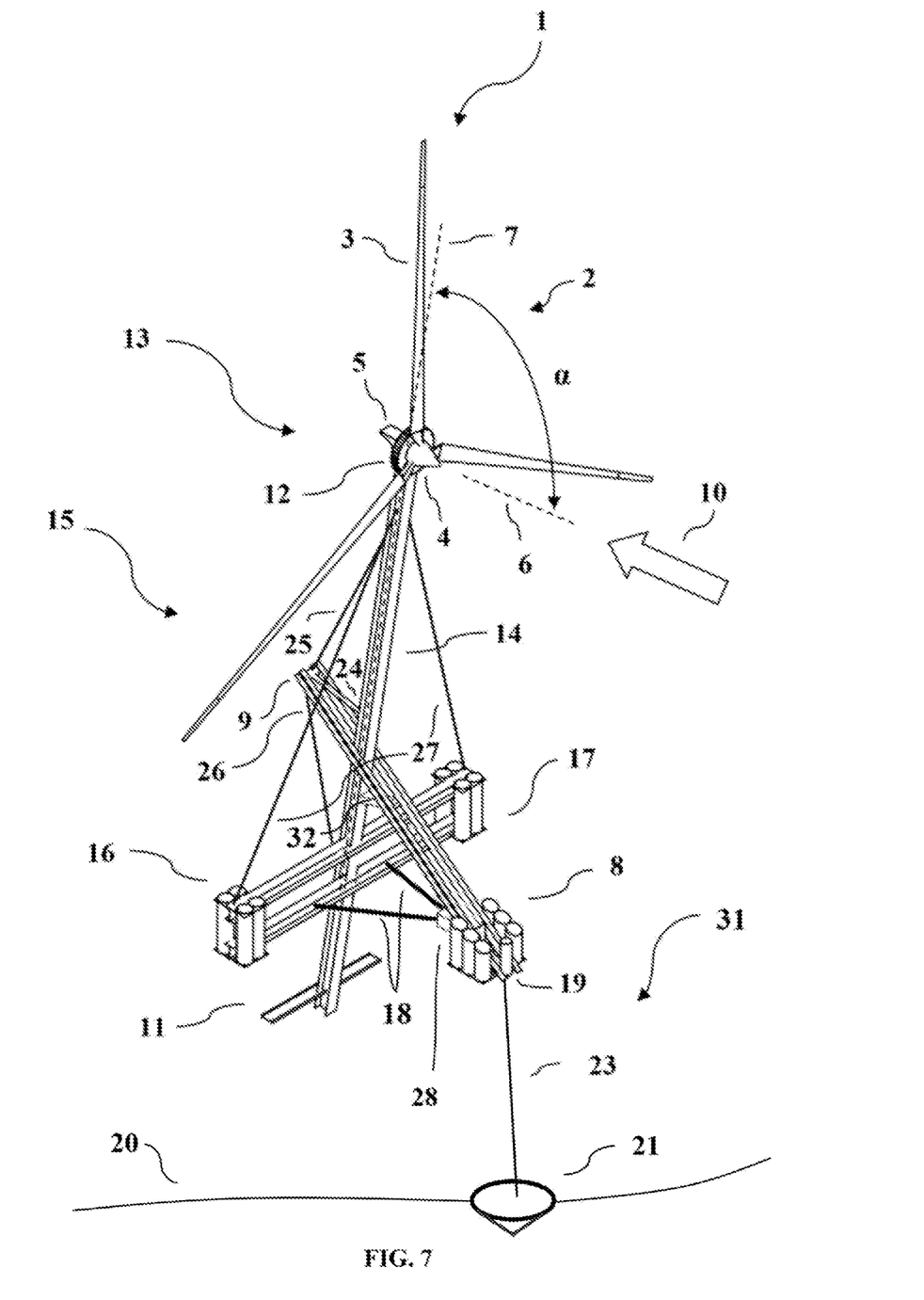
FIG. 7 is a perspective of an alternate structure for the floating platform that uses different connection points between the tower and the articulated support arm and uses guys for structural members between the articulated support arm and the ends of the outriggers.

Also, in example, referring to FIG. 7 an alternate structure for the floating platform uses two guy cables as support arm mates 18 to connect the articulated support arm to the buoyant outriggers 16 and 17. The support arm 8 is held in place with the tower 14 using the support arm lock 32 and secured with suitable fasteners such as bolts.

Figure 8:
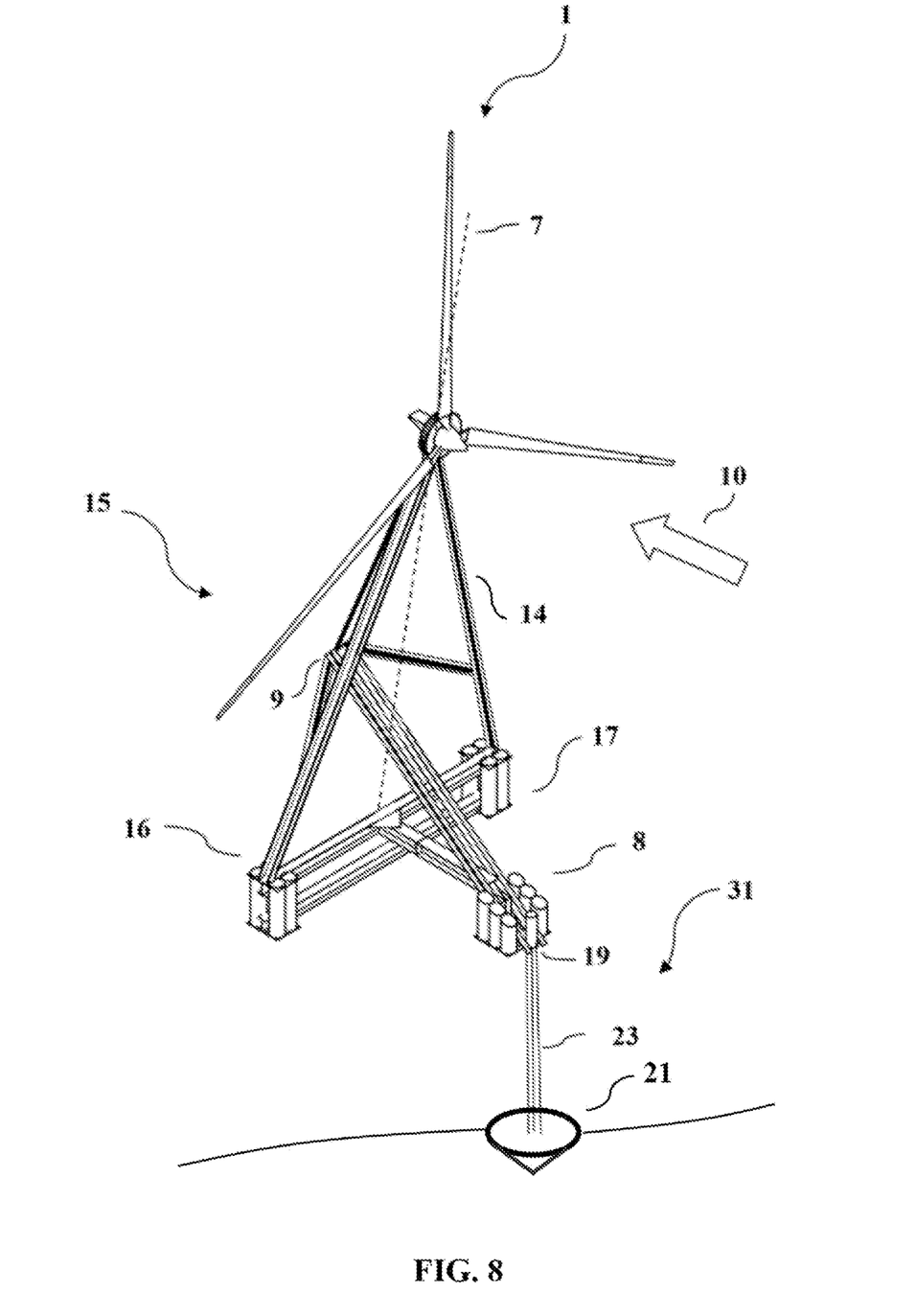
FIG. 8 is a perspective of an alternate structure for the floating platform that uses a different tower and articulated support arm that allows the articulated support arm to pass on the inside of a two-legged tower, as well as a anchor with multiple mooring lines.

Finally, in example, referring to FIG. 8 an alternate structure for the floating platform 15 uses a different tower 14 and articulated support arm 8 that allows the articulated support arm 8 to pass on the inside of a two-legged tower 14. This example has no keel 11 and uses a single anchor 21 connected with three mooring lines 23.

What is claimed is:

1. A floating platform comprising:
   two buoyant outriggers, wherein said buoyant outriggers extend in opposite directions while floating at the water surface;
   a tower, said tower having a longitudinal axis positioned about equally distant from opposing ends of the two buoyant outriggers, said tower extends in an upward direction from the said buoyant outriggers, wherein the upward direction is perpendicular to a reference line defined by the opposing ends of said buoyant outriggers;
   an articulated support arm, said articulated support arm has a buoyant first end that floats near the water surface, a second end that is attached to the said tower with a hinge, and a third end that is attached at a connection to members of said buoyant outriggers or said tower; and
   a rotatable anchor connection attached at the said buoyant first end of the said articulated support arm, said rotatable anchor connection operable to retain said tower within a desired area while also allowing said tower to move in response to at least one of changing wind conditions and changing wave conditions.

2. The floating platform according to claim 1 wherein said rotatable anchor connection is attached to one or more anchors using mooring lines, wherein attachment of said mooring lines allows rotation of said tower relative to said mooring lines while said mooring lines and anchor maintain the system in position.

3. The floating platform according to claim 2 wherein a keel structure extends from members of said buoyant outriggers or said tower substantially downward from said tower structure, said keel contains ballast to resist motions of the floating platform.

4. The floating platform according to claim 3 wherein said tower includes
- a guy post attached substantially perpendicular to said support tower longitudinal axis with at least one of first guy cables connected between said guy post and the end of said tower furthest from said buoyant outriggers,
- second guy cables connected between said guy post and the end of said tower closest to said outriggers,
- third guy cables connected between the end of said tower and the opposing ends of the buoyant outriggers.

5. A wind turbine system comprising the floating platform according to claim 3 a wind turbine generator mounted upon said tower, said wind turbine generator having a longitudinal axis that defines an acute angle with said tower longitudinal axis.

6. The wind turbine system according to claim 5 wherein said rotatable anchor connection includes a slip ring for transferring electrical power from the said wind turbine generator to a submersible electrical conductor when the wind turbine system rotates relative to said set of mooring lines.

7. The wind turbine system according to claim 6 wherein a control system of the said wind turbine generator includes logic to access data of said wind turbine system to affect motions, stresses, and alignment with the wind direction using feedback to the control system of said wind turbine.

8. A floating platform according to claim 1 with a winch and cable maintaining position of said articulated support arm so as to allow the said tower to be transported on water in a nearly horizontal position.

9. A floating platform according to claim 8 with the said winch and cable retracting causing said tower to raise to an operational position where it can be locked to the said articulated support arm.

\* \* \* \* \*